(12) United States Patent
Kishi (10) Patent No.: US 6,905,247 B2
(45) Date of Patent: Jun. 14, 2005

(54) FLUID BEARING AND BRUSHLESS MOTOR HAVING THE SAME

(75) Inventor: Yusuke Kishi, Isesaki (JP)

(73) Assignee: Tokyo Parts Industrial Co., LTD (LR)

( * ) Notice: Subject to any disclaimer, the term of this patent is extended or adjusted under 35 U.S.C. 154(b) by 136 days.

(21) Appl. No.: 10/374,140

(22) Filed: Feb. 25, 2003

(65) Prior Publication Data

US 2003/0161558 A1 Aug. 28, 2003

(30) Foreign Application Priority Data

Feb. 26, 2002 (JP) .................................... 2002-049955

(51) Int. Cl.$^7$ .............................................. F16C 32/06
(52) U.S. Cl. ...................................... 384/120; 384/114
(58) Field of Search ................................ 384/100, 107, 384/113, 114, 120

(56) References Cited

U.S. PATENT DOCUMENTS 5,715,116 A * 2/1998 Moritan et al. ............. 384/107
6,242,830 B1 * 6/2001 Katagiri ..................... 384/114
6,364,532 B1 * 4/2002 Yoshikawa et al. ......... 384/107
2002/0051588 A1 * 5/2002 Koseki et al. .............. 384/100

* cited by examiner

Primary Examiner—Thomas R. Hannon (57) ABSTRACT

A fluid bearing with an oil circulating hole therein has a bearing housing fixedly assembled to a stator base having a closed bottom surface; and upper and lower bearing portions; and a thrust receiving portion to rotatably support a rotating shaft. An opening oil reservoir is in the bearing housing and a lower oil reservoir is formed at the lower portion thereof. An intermediate oil reservoir is located between the upper and lower bearing portions. The oil circulating hole is formed in parallel with the rotating shaft in order to communicate with the opening oil reservoir, the intermediate oil reservoir and the lower oil reservoir. A space is defined at an opening portion which is covered with a cap in order to prevent oil from leaking.

6 Claims, 10 Drawing Sheets

FLUID BEARING AND BRUSHLESS MOTOR HAVING THE SAME

CROSS REFERENCE TO RELATED APPLICATIONS

This application claims priority of Japanese Patent Application No. 2002-049955 filed Feb. 26, 2002.

BACKGROUND OF THE INVENTION

1. Field of the Invention

The present invention relates to a fluid bearing and a brushless motor having the same, and more particularly to a fluid bearing having an oil circulating mechanism for generating kinetic pressure therein, and a brushless motor having the fluid bearing.

2. Description of the Related Art

Recently, a data recording/reproducing device, such as a disk media, etc., is required to be able to operate in high speed. Therefore, to meet this requirement, a kinetic pressure fluid bearing is widely used as a bearing for a spindle motor which is used in the data recording/reproducing device.

In the kinetic pressure fluid bearing, kinetic pressure generating grooves such as herring bone grooves are formed on the outer periphery of a rotating shaft or on the inner periphery of a bearing sleeve at sliding contact portion where the rotating shaft comes in contact with the bearing sleeve. The gap defined at the sliding contact portion between the rotating shaft and the bearing sleeve is filled with lubricant. As the rotating shaft rotates, a pressure is applied to the lubricant in the gap, which causes the rotating shaft of a rotor to be rotatably supported.

The lubricant, which is used in the kinetic pressure fluid bearing, is expanded by the friction heat generated during the rotation of the rotating shaft, which is leaked out of the gap. In this case in which the lubricant is exhausted due to the leakage in the gap, the efficiency of the bearing is remarkably deteriorated. Therefore, it is necessary that a lubricant reservoir should be disposed near the sliding contact portion. Thereby, the lubricant is temporarily reserved in the lubricant reservoir when the lubricant is sufficiently supplied to the gap, while the lubricant is supplied into the gap from the lubricant reservoir when the lubricant is insufficient in the gap.

The gap of the sliding contact portion is preferably about 5~20 μm. In general, when a plurality of the sliding contact portions having the gap is formed on one rotating shaft, the lubricant reservoir is installed in each sliding contact portion. When the gap is filled with the lubricant, each space in the sliding contact portions is nearly sealed. When a pressure difference exists between the lubricant reservoirs which are blocked by the respective sliding contact portion, this causes the lubricant to be unevenly supplied to the respective sliding contact portion. Therefore, there is a problem in that it is difficult to generate the kinetic pressure uniformly. To solve this problem, the lubricant reservoirs are connected with one another so that the pressure in the respective lubricant reservoir is constant, while the bearing is also provided with a hole for circulating the lubricant therein.

In the kinetic pressure fluid bearing as constructed above, the bearing itself can be made in small size. Further, since a fluid, for example lubricant, presents between the rotating shaft and the bearing, the bearing is excellently operated in low noise and in low vibration, and has strong shock-endurance. Further, the bearing has a great load allowance, so that it is possible to significantly prevent the rotating shaft from being shaken.

In the kinetic pressure fluid bearing as described above, for example, the oil circulating hole can be formed in the bearing which is comprised of a cylindrical bearing sleeve and a housing receiving the bearing sleeve. It is known that an axial concave groove as the oil circulating hole is formed on the outer peripheral surface of the bearing sleeve or on the inner peripheral surface of the housing to which the bearing sleeve is fixedly attached. Further, it is well known that a radial concave groove or a radial traverse hole can be formed on the end surface of the bearing sleeve, or that a through-hole can be formed in the rotating shaft to pass from the end surface of the rotating shaft disposed in the bearing to the outer peripheral surface near a kinetic generating portion. In these structures, the total number of parts is increased, and the structures become complicated. Further, forming the concave groove or the through-hole requires numerous man-hours and high precision.

SUMMARY OF THE INVENTION

The present invention is contrived to solve the foregoing problems. It is an object of the present invention to provide a fluid bearing having a stable oil circulating part whereby decrease of man-hours, high precision of work, less number of parts, low cost and continuous rotation under high speed are greatly achieved.

It is another object of the present invention to provide a brushless motor having the fluid bearing in which the oil circulating part is formed to stably circulate oil such as lubricant in the fluid bearing.

In order to achieve the first object of the present invention, according to an aspect of the present invention, there is provided a fluid bearing comprising a bearing part, a plurality of oil reservoirs and an oil circulating part. The bearing part includes a cylindrical bearing housing having a bottom surface and kinetic pressure generating grooves formed on an inner peripheral surface thereof, which rotatably supports a rotating shaft. The oil reservoirs are respectively formed at predetermined positions of an inner peripheral surface in an axial direction of the rotating shaft. The oil circulating part is formed in the bearing housing and connects the oil reservoirs with one another.

With this structure, there can be provided a fluid bearing including an oil circulating hole having high precision and good working efficiency.

The oil circulating part can be a hole which is formed in parallel with the rotating shaft and which connects the oil reservoirs with one another, or a groove which is formed to be in parallel with the rotating shaft in the inner surface of the bearing housing.

Further, in the case that each oil reservoir is respectively formed at an opening portion, an intermediate portion and a bottom portion, if the intermediate oil reservoir or the bottom oil reservoir is connected to the opening oil reservoir, the connection is achieved at two parts. Therefore, it can be easy to achieve the working of the oil reservoirs.

Further, there can be provided a fluid bearing including an oil circulating hole having high precision and no interruption of oil supply under any high speed rotation.

In order to achieve the second object of the present invention, according to the other aspect of the present invention, there is provided a brushless motor comprising a cylindrical bearing housing which is fixedly mounted on a stator base of the motor; a stator core which is disposed to surround the bearing housing; a rotor which is rotatably disposed opposite to the stator core; and a fluid bearing part which is formed in the bearing housing, for supporting a rotating shaft of the rotor, the fluid bearing part including a plurality of oil reservoirs to reserve oil and an oil circulating part to connect the oil reservoirs with one another.

Therefore, the motor can solve above forgoing problems. Further, there is an advantage in that it is possible to provide the brushless motor which has a low price and to which oil is continuously supplied under any high speed rotation.

BRIEF DESCRIPTION OF THE DRAWINGS

The above objects and advantages of the present invention will become more apparent by describing in detail the preferred embodiments thereof with reference to the attached drawings, in which.

DETAILED DESCRIPTION OF THE INVENTION

Hereinafter, the kinetic pressure fluid bearing according to the preferred embodiments of the present invention will be described in more detail with reference to the accompanying drawings.

Figure 1:
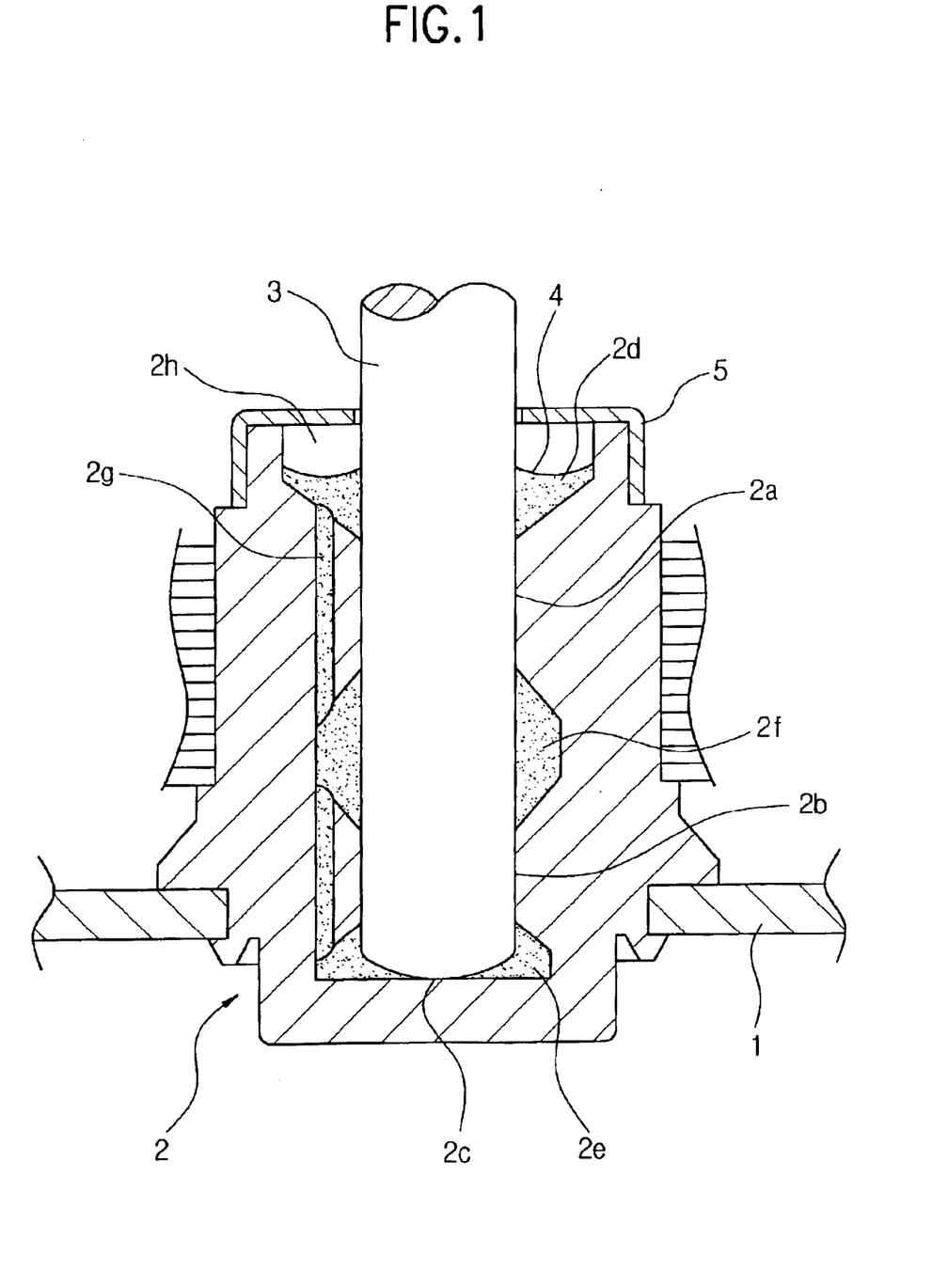
FIG. 1 is a sectional view of a kinetic pressure fluid bearing according to the first preferred embodiment of the present invention, in which essential parts of the fluid bearing are shown.

FIG. 1 is a sectional view of a kinetic pressure fluid bearing according to the first embodiment of the present invention, in which essential parts are shown. Referring to FIG. 1, a bearing housing 2, which is fixedly mounted in a mounting hole of a stator base 1, has a cylindrical body having a blind hole therein. The bearing housing 2 also includes the upper bearing portion 2a and the lower bearing portion 2b which support the rotating shaft 3 enabling to rotate, and the thrust bearing portion 2c which axially supports a rotating shaft 3 therein.

Further, an opening oil reservoir 2d is formed at an opening portion of the bearing housing 2, and a bottom oil reservoir 2e is formed at a bottom portion of the bearing housing 2. The intermediate oil reservoir 2f is formed between an upper bearing portion 2a and a lower bearing portion 2b.

Further, the oil circulating hole 2g is formed in parallel with the rotating shaft 3 in order to communicate the opening oil reservoir 2d, the intermediate oil reservoir 2f and the bottom oil reservoir 2e with one another.

The bearing housing 2 having above structure is filled with oil 4 such as lubricant.

Further, a space 2h is formed at the opening portion of the bearing housing 2, and the cap 5 for preventing the oil from leaking is fixedly attached to the opening portion of the bearing housing 2.

Figure 2:
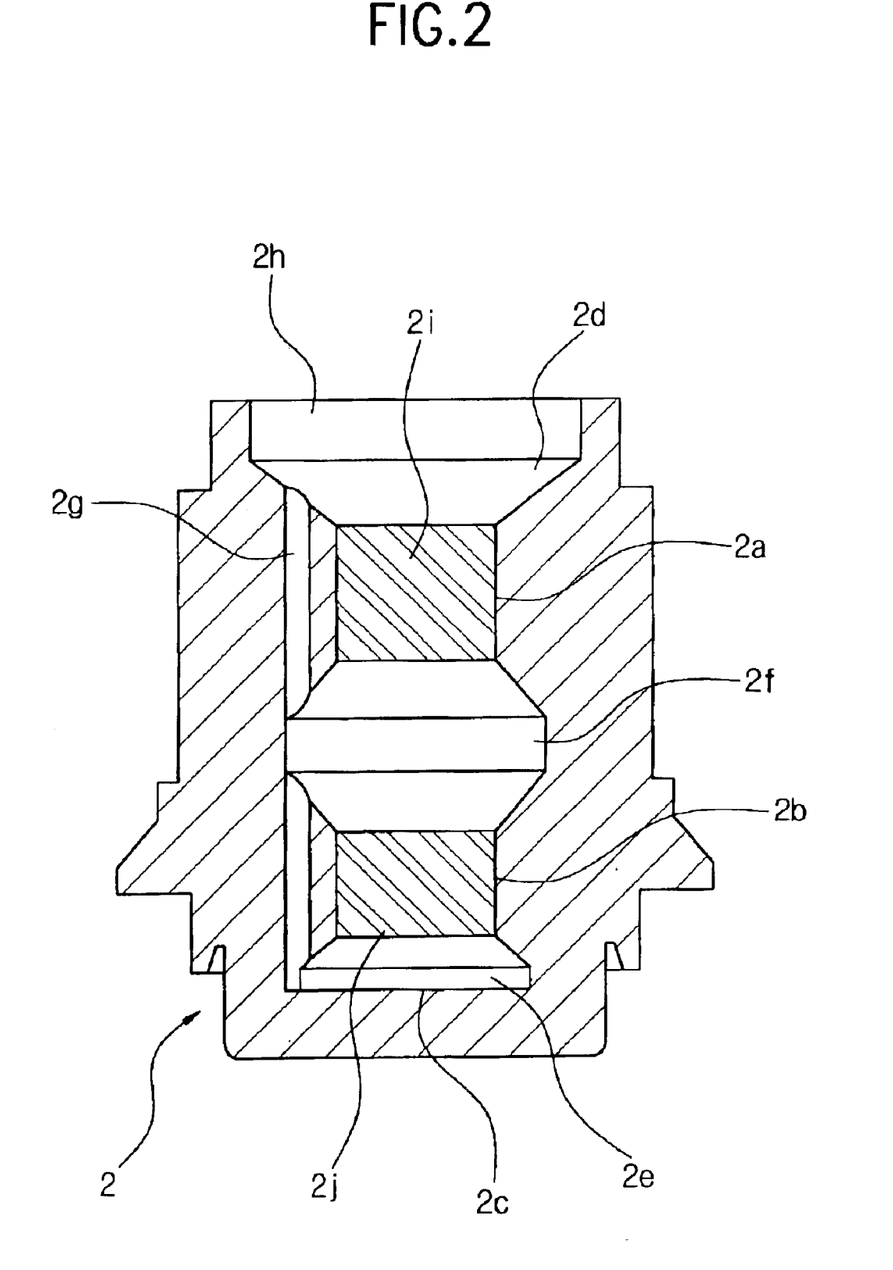
FIG. 2 is a sectional view of a bearing housing of the fluid bearing shown in FIG. 1.

FIG. 2 is a sectional view of a bearing housing 2 of the fluid bearing shown in FIG. 1, which explains the structure of the kinetic pressure fluid bearing. In FIG. 2, a herring bone type of kinetic generating grooves 2i are carved on each inner peripheral surface of the upper bearing portion 2a and the lower bearing portion 2b. However, the kinetic generating grooves 2i may be formed on an outer peripheral surface of the rotating shaft 3 including the upper bearing portion 2a and the lower bearing portion 2b. Furthermore, a kinetic pressure fluid bearing having a thrust structure may be formed on a thrust receiving portion 2c which comes in contact with the end portion of the rotating shaft 3.

Figure 3A:
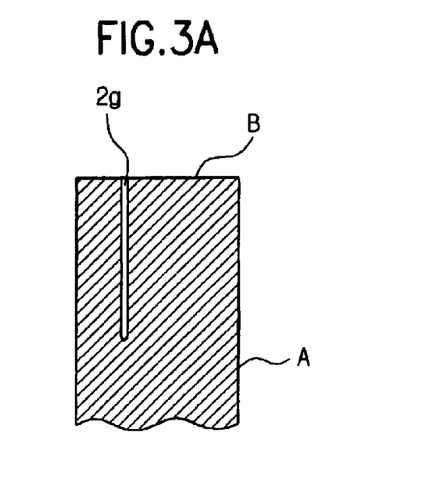
FIGS. 3A to 3F are views explaining the working process of the bearing housing of the fluid bearing shown in FIG. 1.
Figure 3B:
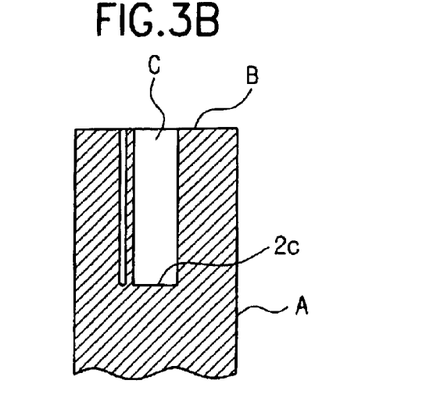
Figure 3C:
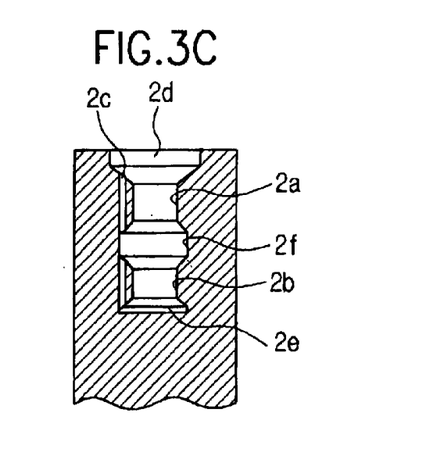
Figure 3D:
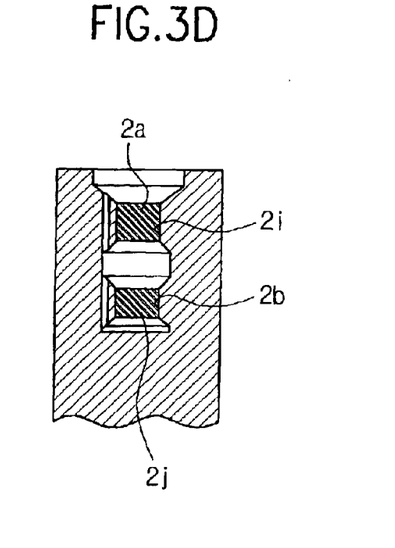
Figure 3E:
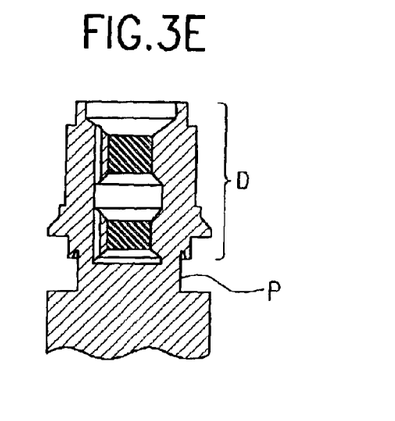
Figure 3F:
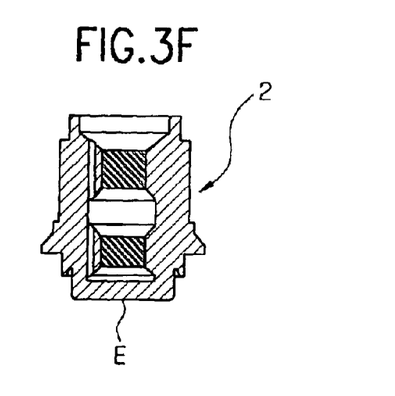
Figure 4:
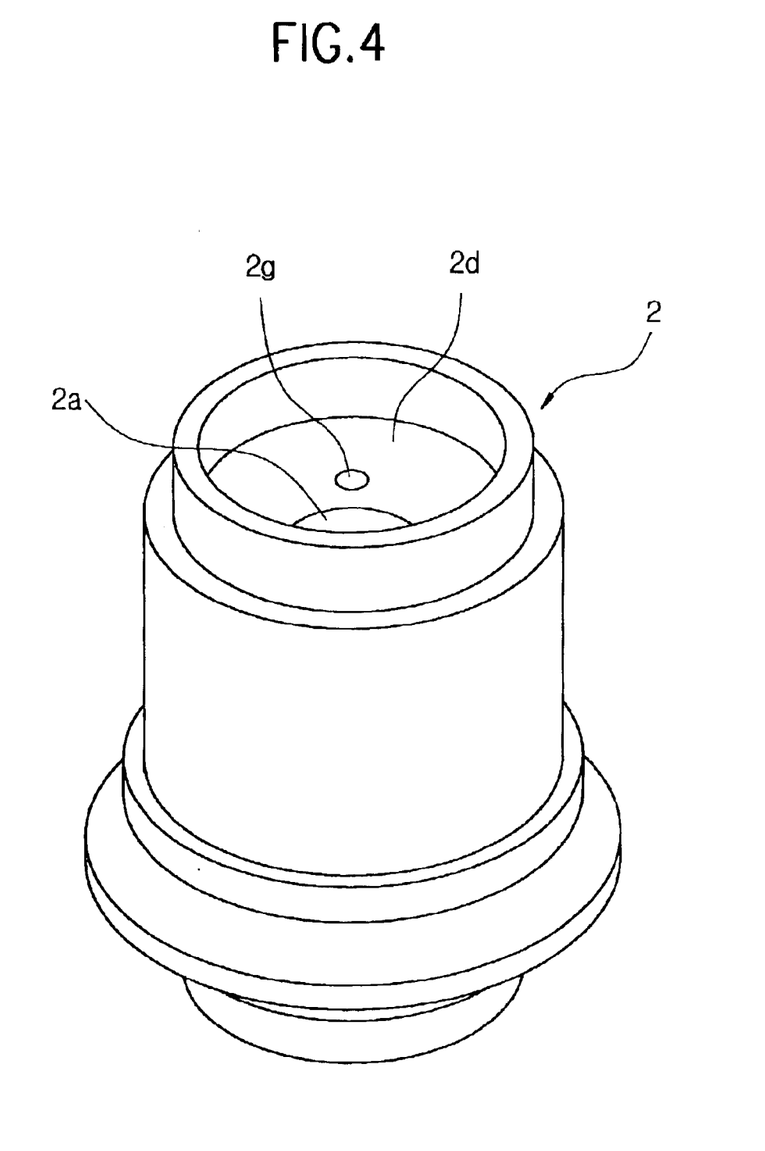
FIG. 4 is a perspective view of the kinetic pressure fluid bearing shown in FIG. 1.

FIGS. 3A to 3F are views explaining an example of the working process of the bearing housing shown in FIG. 1, and FIG. 4 is a perspective view showing the worked bearing housing.

Hereinafter, the method of fabricating the bearing housing 2 will be explained with respect to FIGS. 3A to 3F. First of all, an end portion A of metallic solid bar, which has a circular shape in a cross-sectional view as shown in FIG. 3A and which is a subject material of the bearing housing 2, is chucked by the chuck of NC lathe (not shown). Then, the small oil circulating hole 2g is formed at a predetermined portion distanced from a center portion of an end surface B.

As shown in FIG. 3B, the hole C is perforated by a predetermined depth at the center portion of the end surface B in order to form the bearing portions 2a and 2b, and to form the thrust receiving portion 2c supporting the rotating shaft 3 shown in FIG. 1.

As shown in FIG. 3C, the oil reservoirs 2d, 2f, 2e are respectively formed on the opening portion, the intermediate portion and the bottom portion by cutting process. And also the oil circulating hole 2g is passed through the oil reservoirs 2d, 2f and 2e, while the upper bearing portion 2a and the lower bearing portion 2b are formed.

Continuously, as shown in FIG. 3D, the herring bone type of the kinetic pressure generating grooves 2i and 2j are carved on the inner peripheral surface of the upper bearing portion 2a and the lower bearing portion 2b.

As shown in FIG. 3E, the outside D of the bearing housing 2 is formed by cutting, and finally a portion P is cut so that the bottom surface is finished as like E.

According to the above-described working method, since the bearing portions 2a and 2b can be integrally formed along with the oil circulating hole 2g in the bearing housing 2, and also the formed holes are formed in the direction of the axis of the bearing housing 2 so as to be eccentric from or coaxial with the axis of the bearing housing 2, the cutting process is sufficiently carried out with one process. Thereby, the cost of the materials and the working can be greatly reduced. Furthermore, since the working piece does not need to be reset, the working precision and the working efficiency can be improved. Meanwhile, regarding the order of the cutting process, it is preferable that the oil circulating hole 2g having relatively smaller diameter is formed first.

However, it is possible to form the hole C first regardless of the above-described method.

On the other hand, the oil circulating hole 2g, which is described relating to the above-mentioned embodiment, is separated from the bearing portions 2a and 2b. That is, the oil circulating hole 2g is spaced apart from the hole C in FIG. 3. However, the oil circulating hole 2g may be replaced by the groove which is formed on the sliding contact surface of the bearing portions 2a and 2b, for example, the peripheral surface of the hole C.

Referring to FIGS. 3A to 3F, in the case that the groove functions as the oil circulating hole 2g, the groove is easily formed if the oil circulating hole 2g is formed first and then the hole C is formed to overlap the oil circulating hole 2g. The oil circulating hole 2g or the groove constitutes a circulating portion.

FIG. 4 is a perspective view of the kinetic pressure fluid bearing shown in FIG. 1. Referring to FIG. 4, it can be known that the oil circulating hole 2g is formed to be adjacent to the bearing portion 2a. Also, the opening oil reservoir 2d is formed at the upper portion of the bearing housing 2.

Figure 5:
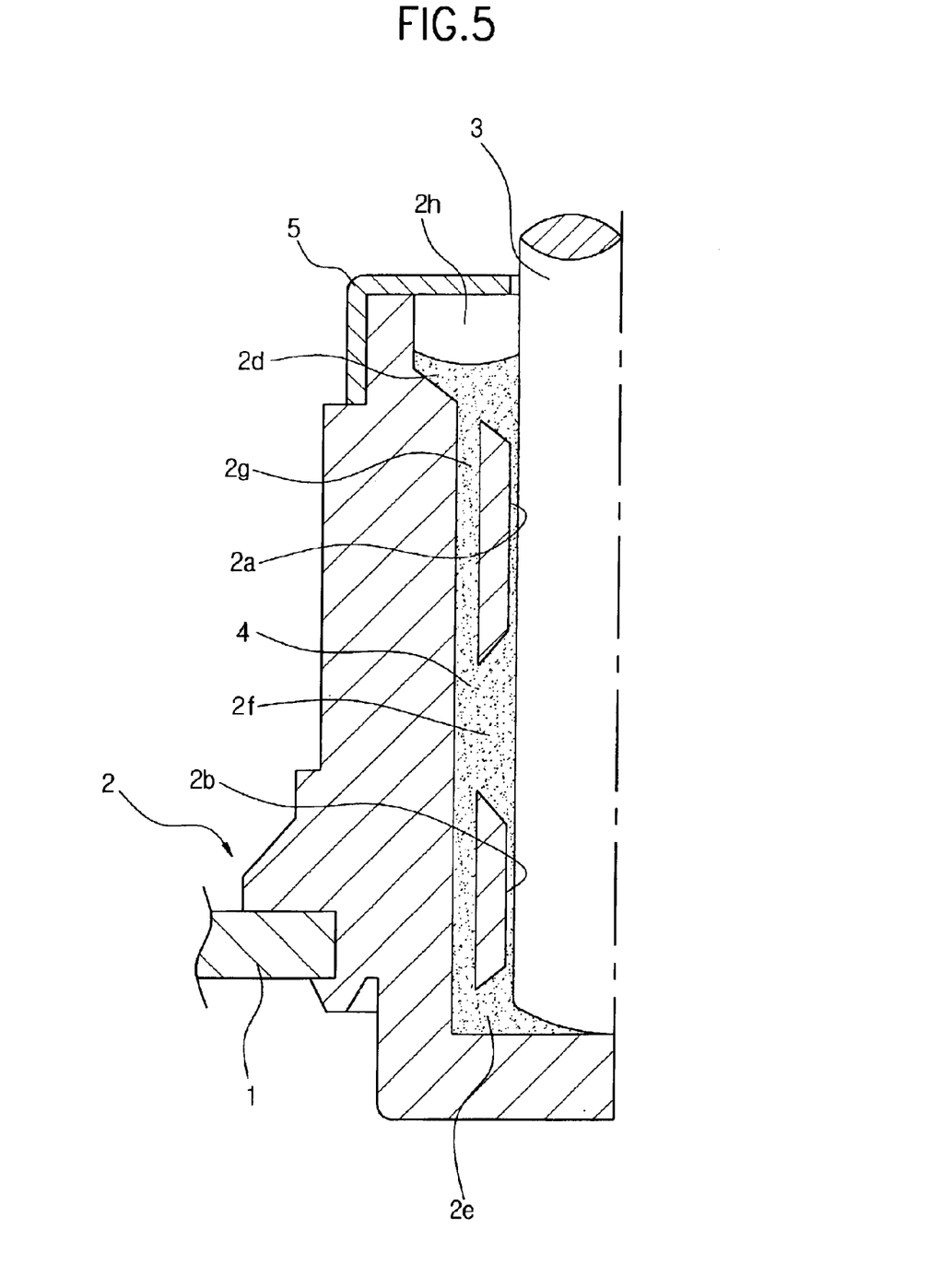
FIG. 5 is a view explaining the circulation of the oil in the kinetic pressure fluid bearing shown in FIG. 1.

FIG. 5 is a view explaining the circulation of the oil in the kinetic pressure fluid bearing in FIG. 1.

In FIG. 5, the oil 4 such as the lubricant is filled in the bearing housing 2 with the space 2h between a cap 5 and the oil surface. The rotating shaft 3 and the bearing portions 2a and 2b come in sliding contact with each other by the oil 4 presenting therebetween. When the rotating shaft 3 rotates in high speed, however, the temperature of the oil 4 increases so that the extension of the oil results from the friction of the sliding contact portion. The extended oil 4 passes through the circulating hole 2g, which in turn is collected in the opening oil reservoir 2d of the space 2h.

When the rotating shaft 3 rotates in low speed, the temperature of the oil 4 decreases so that the oil 4 is contracted. As a result, the lubrication slows down. Accordingly, the oil 4 is supplied from the opening oil reservoir 2d. As described above, the oil circulating hole 2g can circulate well the oil 4 in the bearing housing 2.

Furthermore, since the pressure in the bearing housing 2 can be identical with an atmosphere pressure by forming the oil circulating hole 2g, the motor can be easily assembled and disassembled into/from the bearing housing 2 with relation to the assembling process of a motor.

Figure 6:
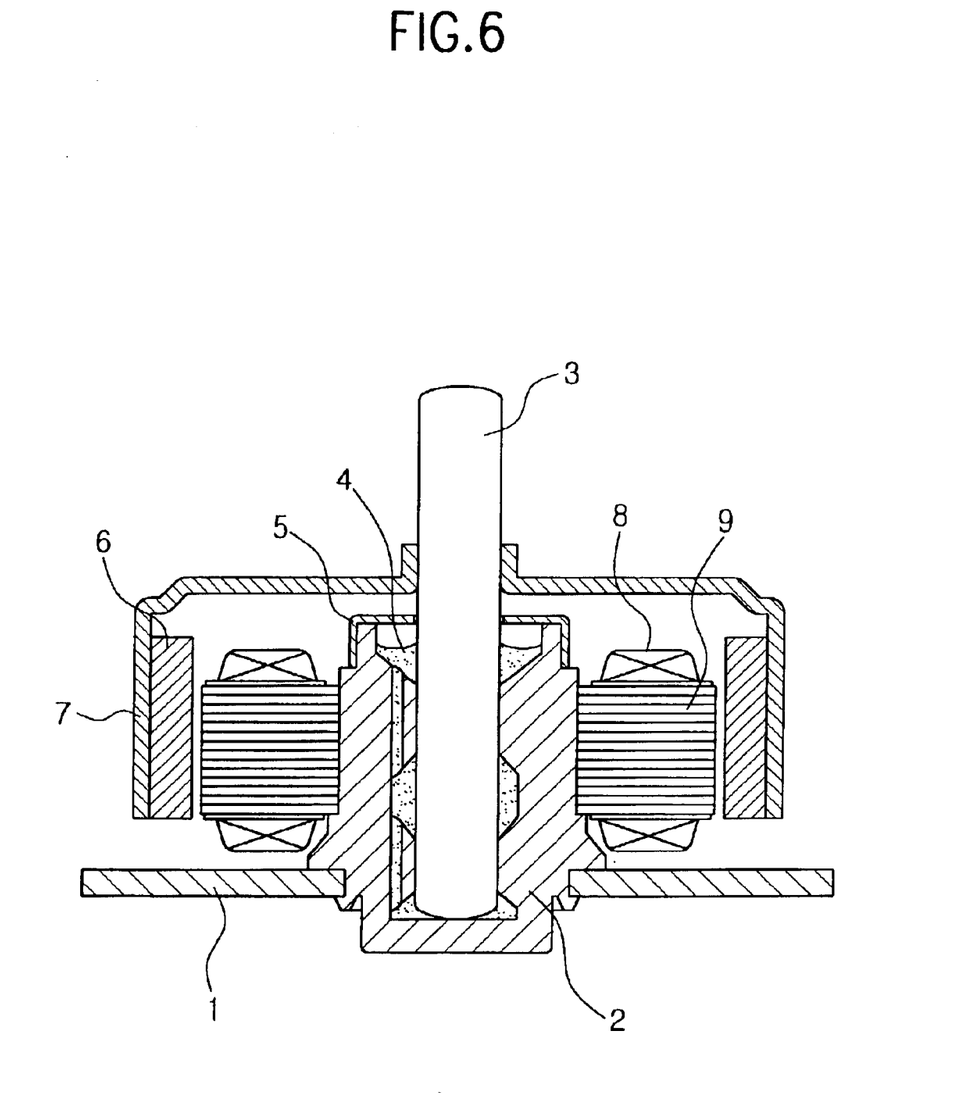
FIG. 6 is a sectional view of a brushless motor having the kinetic pressure fluid bearing according to the first preferred embodiment of the present invention, in which essential parts of the brushless motor are shown.

FIG. 6 is a sectional view of a brushless motor having the kinetic pressure fluid bearing according to the first preferred embodiment of the present invention, in which essential parts of the brushless motor are shown.

In FIG. 6, the bearing housing 2 including the fluid bearing according to the present invention as described above is fixedly attached to the stator base 1. The rotating shaft 3, which is press-fitted in a rotator yoke 7, is slidably supported by means of the bearing housing 2. The rotator yoke 7 has a cup-shape, in which an annular magnet 6 having a plurality of magnetic poles is fixedly attached on an inner peripheral surface of the yoke 7. Further, the cap 5 is fixedly attached to the opening of the bearing housing 2, while a stator core 9 having coils 8 wound thereon is fixedly attached to an outer peripheral surface of the bearing housing 2.

Figure 7:
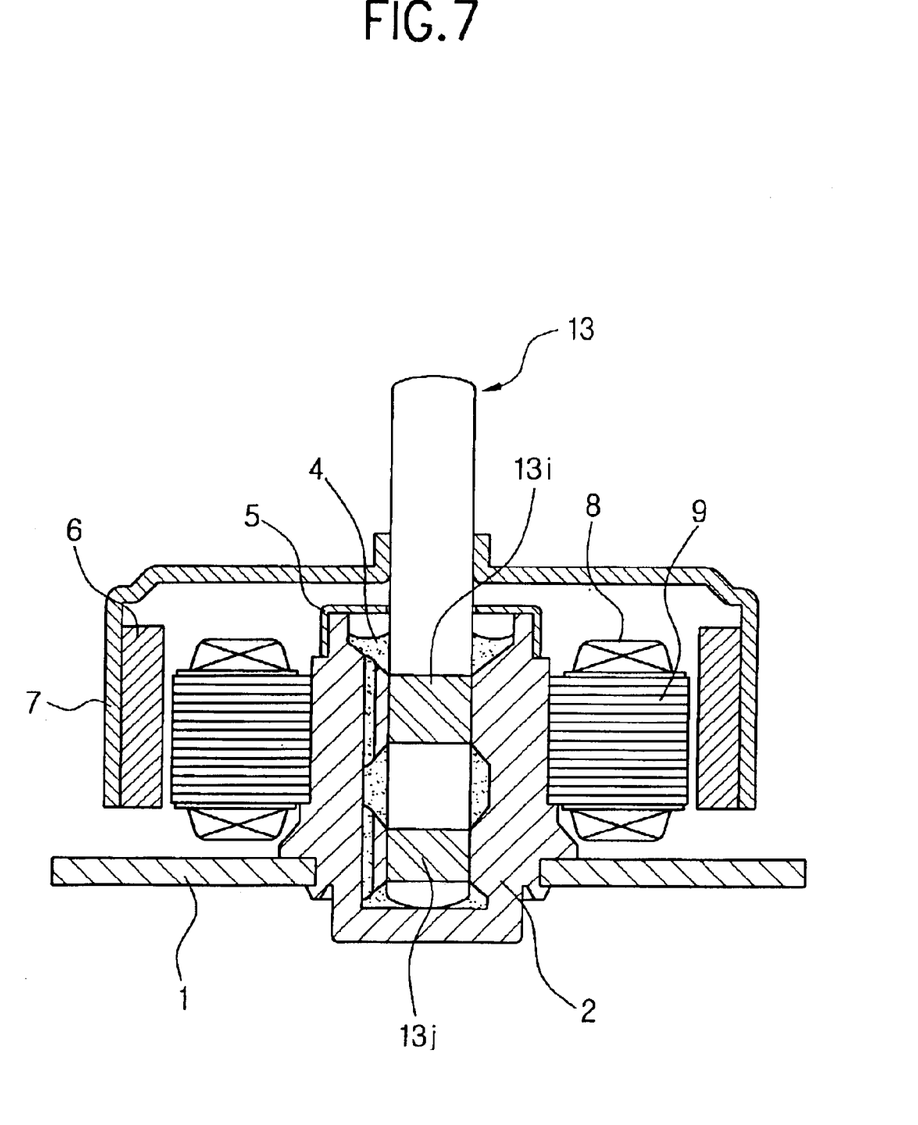
FIG. 7 is a sectional view of the brushless motor according to the present invention, in which kinetic pressure generating grooves are formed on a rotating shaft thereof.

FIG. 7 is a sectional view of the brushless motor according to the present invention, in which kinetic pressure generating grooves are formed on a rotating shaft thereof. The brushless motor as shown in FIG. 7 basically has a similar structure to that as shown in FIG. 6. However, the brushless motor in FIG. 7 is different from the brushless motor in FIG. 6 in that the kinetic pressure generating grooves 13i and 13j are carved on the rotating shaft 13.

Figure 8:
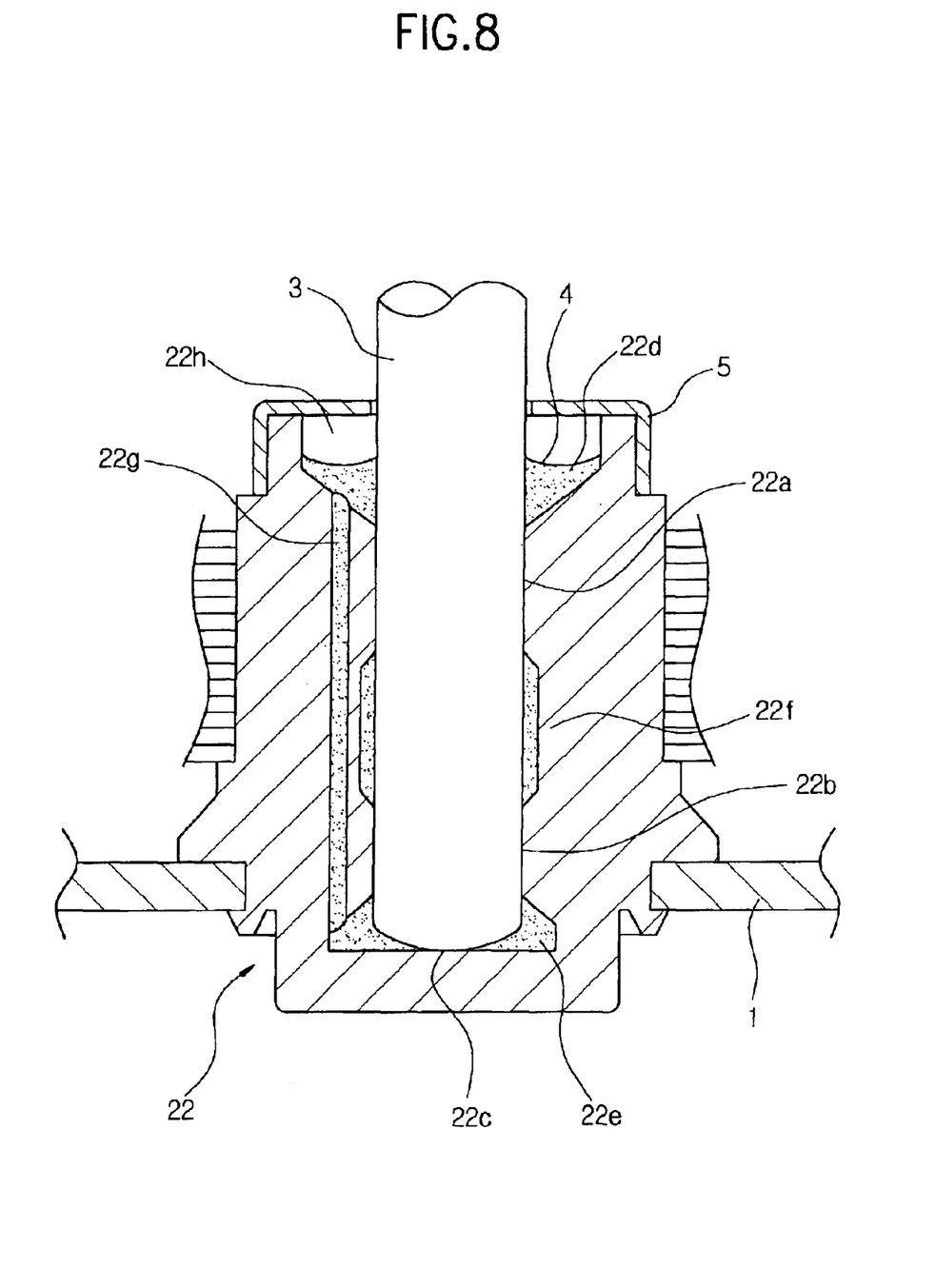
FIG. 8 is a sectional view of a kinetic pressure fluid bearing according to the second embodiment of the present invention, in which essential parts are shown.

FIG. 8 is a sectional view of a kinetic pressure fluid bearing according to the second embodiment of the present invention, in which essential parts are shown. In FIG. 8, an upper bearing portion 22a, a lower bearing portion 22b and a thrust bearing portion 22c are formed in a bearing housing 22 fixedly assembled in a fixing hole of a stator base 1, which support a rotating shaft 3. Furthermore, an opening oil reservoir 22d is formed at an opening portion of the bearing housing 22, and a bottom oil reservoir 22e is formed at a lower portion of the bearing housing 22. An intermediate oil reservoir 22f is formed between the upper bearing portion 22a and the lower bearing portion 22b. The opening oil reservoir 22d, the lower oil reservoir 22e and the intermediate oil reservoir 22f are filled with the oil 4.

In addition, the oil circulating hole 22g is formed in the bearing housing 22 to be in parallel with the rotating shaft 3 in order to communicate the opening oil reservoir 22d with the lower oil reservoir 22e. A space 22h is defined at the opening portion of the bearing housing 22 by means of an annular wall of the bearing housing 22, which is covered with the cap 5 so that the oil is prevented from leaking from the bearing housing 22.

In this structure, the oil 4 circulates through the oil circulating hole 22g from the opening oil reservoir 22d to the sliding contact portions between the rotating shaft 3 and the upper bearing portion 22a and between the rotating shaft 3 and the lower bearing portion 22b.

Figure 9:
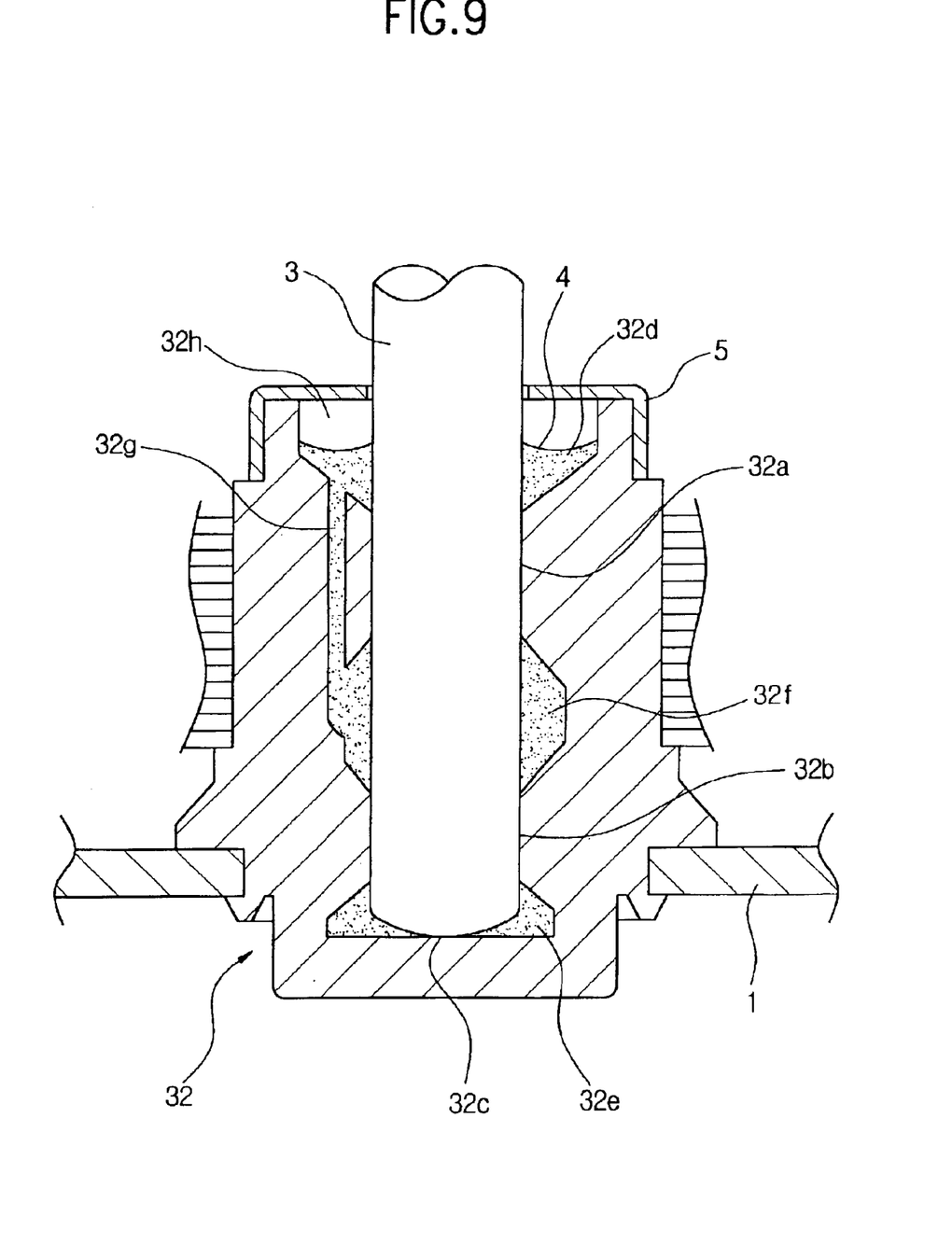
FIG. 9 is a sectional view of a kinetic pressure fluid bearing according to the third embodiment of the present invention, in which essential parts are shown.

FIG. 9 is a sectional view of a kinetic pressure fluid bearing according to the third embodiment of the present invention, in which essential parts are shown. In FIG. 9, an upper bearing portion 32a, a lower bearing portion 32b and a thrust receiving portion 32c are formed in the bearing housing 32 fixedly assembled in a fixing hole of a stator base 1. Also, an opening oil reservoir 32d is formed at an opening portion of a bearing housing 32, and a lower oil reservoir 32e is formed at a lower portion of the bearing housing 32. An intermediate oil reservoir 32f is formed between an upper bearing portion 32a and a lower bearing portion 32b. The opening oil reservoir 32d, the lower oil reservoir 32e and the intermediate oil reservoir 32f are filled with oil 4 such as lubricant.

Meanwhile, an oil circulating hole 32g is formed in parallel with the rotating shaft 3 in order to communicate the opening oil reservoir 32d with the intermediate oil reservoir 32f. Also, a space 32h is defined at the opening portion of the bearing housing 32 by means of an annular wall of the bearing housing 32, which is covered with the cap 5 so that the oil is prevented from leaking from the bearing housing 32. In this structure, the oil 4 circulates through the oil circulating hole 32g from the opening oil reservoir 32d to the sliding contact portions between the rotating shaft 3 and the upper bearing portion 32a and between the rotating shaft 3 and the lower bearing portion 32b.

According to the embodiments of the present invention, the bearing housings 2, 22 and 32 are integrally formed with the closed bottom side, and the cap 5 for preventing oil from leaking is fixedly covered on the opening portion of the bearing housing. However, it is possible that a cover is formed integrally with the bearing housing as like the bottom surface instead of the cap 5, in which an opening is formed in order that a shaft extends through the opening.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A fluid bearing comprising:
    a cylindrical-shaped first hole of which at one end is open and the other end is closed, the first hole being formed in a cylindrical bearing housing of said fluid bearing which comprises a predetermined length of cylindrical metal rod;
    a cylindrical-shaped second hole of which at one end is open and the other end is closed, the second hole being formed in the bearing housing of said fluid bearing to be in parallel relation with the central axis of the first hole, and the second hole having a predetermined depth that is substantially the same as that of the first hole; and
    a plurality of ring-shaped grooves being formed at an inner surface of the second hole, the ring-shaped grooves being in communication with the first hole and being sized to fit within an outside diameter of the first hole centering around the central axis of the second hole.

2. A fluid bearing as claimed in claim 1, wherein the ring-shaped grooves comprise a first groove at which one side is open, the first groove being formed at one end of the cylindrical metal rod, a second groove formed at the closed end of the second hole, and a third groove formed between the first groove and the second groove.

3. A fluid bearing as claimed in claim 2, wherein a kinetic generating groove is formed on an outer peripheral surface of the second hole among the first groove, the second groove and the third groove.

4. A fluid bearing as claimed in claim 1, wherein a kinetic generating groove is formed on an outer peripheral surface of the second hole between the ring-shaped grooves.

5. A brushless motor by using a fluid bearing, the brushless motor comprising:
    a fluid bearing including a cylindrical-shaped first hole of which at one end is open and the other end is closed, the first hole being formed in a cylindrical bearing housing of said fluid bearing which comprises a predetermined length of cylindrical metal rod;
    a cylindrical-shaped second hole of which at one end is open and the other end is closed, the second hole being formed in the bearing housing of said fluid bearing to be in parallel with the central axis of the first hole, and the second hole having a predetermined depth that is substantially the same as that of the first hole;
    a plurality of ring-shaped grooves being formed at an inner surface of the second hole, the ring-shaped grooves being in communication with the first hole and being sized to fit within an outside diameter of the first hole centering around the central axis of the second hole, wherein the ring-shaped grooves comprise a first groove of which at one side is open, the first groove being formed at one end side of the cylindrical metal rod, a second groove formed at the closed end of the second hole, and a third groove formed between the first groove and the second groove;
    a stator having a stator core which is disposed to surround the cylindrical bearing housing, in which the closed ends of the first hole and the second hole in the fluid bearing are fixed to the stator; and
    a rotator having a rotating shaft which is rotatably supported by a fluid bearing.

6. A brushless motor as claimed in claim 5, wherein a kinetic generating groove is formed on an outer peripheral surface of the second hole among the first groove, the second groove and the third groove.

* * * * *